United States Patent [19]

Iba et al.

[11] Patent Number: 4,640,586
[45] Date of Patent: Feb. 3, 1987

[54] OBJECTIVE FOR A BINOCULAR STEREOMICROSCOPE

[75] Inventors: Yoichi Iba; Tadashi Kimura; Kazuo Kajitani, all of Tokyo, Japan

[73] Assignee: Olympus Optical Co., Ltd., Tokyo, Japan

[21] Appl. No.: 759,242

[22] Filed: Jul. 26, 1985

[30] Foreign Application Priority Data

Jul. 31, 1984 [JP] Japan .................. 59-159368

[51] Int. Cl.⁴ .............................................. G02B 21/02
[52] U.S. Cl. ....................................... 350/414; 350/515
[58] Field of Search ......................... 350/414, 514, 515

[56] References Cited

U.S. PATENT DOCUMENTS 4,447,717 5/1984 Nohda .................. 350/515
4,518,231 5/1985 Muchel et al. ...... 350/515

FOREIGN PATENT DOCUMENTS 3217776 11/1983 Fed. Rep. of Germany .
203411 11/1983 Japan .

*Primary Examiner*—John K. Corbin
*Assistant Examiner*—P. M. Dzierzynski
*Attorney, Agent, or Firm*—Cushman, Darby & Cushman

[57] ABSTRACT

An objective to be used with a single-objective type binocular stereomicroscope which comprises an objective for forming an afocal image, and two observation optical systems for observing the afocal image by the right and left eyes, the objective being arranged to fulfill the condition shown below so as to thereby prevent the error in the sense of depth and distance from occurring.

$$\left| \frac{\theta_R - \theta_L}{\theta_R} \right| < 0.00775$$

10 Claims, 17 Drawing Figures

OBJECTIVE FOR A BINOCULAR STEREOMICROSCOPE

BACKGROUND OF THE INVENTION (a) Field of the Invention

The present invention relates to an objective for a binocular stereomicroscope and, more particularly, to an objective of so-called infinite distance correction type which is arranged that the rays which come out from the objective form an afocal image and which is to be used with a single-objective type binocular stereomicroscope (a binocular stereomicroscope which has only one objective).

(b) Description of the Prior Art

The perception of depth and distance is caused when observing a specimen through a stereomicroscope. The largest factor that causes the perception of depth and distance is the parallax between both eyes.

On the other hand, when observing a specimen having a flat surface through a stereomicroscope, the observed image sometimes does not look like a flat surface but looks like a convex surface. This phenomenon inevitably occurs more or less on the single-objective type binocular stereomicroscopes. The phenomenon that a flat surface looks like a convex surface is caused by the perception of depth and distance, i.e., it occurs because the marginal portion is perceived to be deeper and more distance, compared with the center of field, as the distance from the center of field becomes larger.

The fact to cause the perception of depth and distance is an important characteristic of stereomicroscopes which other types of microscopes do not have. The fact that an error is caused in the perception of depth and distance so that the flat surface of the specimen looks like a convex surface as mentioned in the above is a disadvantage of single-objective type stereomicroscopes.

The error in the perception of depth and distance is caused due to the fact that asymmetrical deformation of image, which does not occur at the time of observation through microscopes in general, occurs in the image observed through a single-objective type binocular stereomicroscope. As a result, a deviation occurs in the parallax between both eyes and causes the error in the perception of depth and distance. However, there is no known single-objective type binocular stereomicroscope arranged to correct the asymmetrical deformation of image by noticing the above-mentioned cause of the error in the perception of depth and distance.

For example, in case of the single-objective type stereomicroscope disclosed in Japanese published unexamined patent application No. 203411/83 (German Pat. No. 32 17 776), the embodiments thereof show that the value of $$\left| \frac{\theta_R - \theta_L}{\theta_R} \right|$$

which shows the asymmetrical deformation of image as described later is large, i.e., 0.015 to 0.05. This value is large to the degree that, when observing a flat surface, the observer gets hallucinated that he is looking, for example, at a spherical surface of a radius about 400 mm to 120 mm in a field of a diameter of 100 mm formed at a distance of distinct vision of 250 mm.

SUMMARY OF THE INVENTION

It is, therefore, a primary object of the present invention to provide an objective for a single-objective type binocular stereomicroscope which does not cause the error in the perception of depth and distance that the central portion of the observed image looks as if it is risen.

The present invention provides an objective to be used with a so-called single-objective type binocular stereomicroscope, which comprises an objective that forms an afocal image and two observation optical systems for observing the afocal image by the right and left eyes, said obejctive being arranged to fulfill the condition shown below where reference symbol $\theta_R$ represents the angle between a ray that comes from an arbitrary point in a plane to be observed, which is perpendicular to the optical axis of said objective, and passes the center of pupil of one of said observation optical systems after passing through said objective and a ray that comes from the intersecting point of said plane to be observed and the optical axis of said objective and passes said center of pupil of said one of said observation optical systems after passing through said objective, said angle being formed by said two rays just after said two rays come out from said objective, and reference symbol $\theta_L$ represents the angle between a ray that comes from said arbitrary point in said plane to be observed and passes the center of pupil of the other one of said observation optical systems after passing through said objective and a ray that comes from said intersecting point of said plane to be observed and the optical axis of said objective and passes said center of pupil of said other one of said observation optical systems after passing through said objective, said angle being formed by said two rays just after said two rays come out from said objective.

$$\left| \frac{\theta_R - \theta_L}{\theta_R} \right| < 0.00775$$

By arranging the objective according to the present invention as described in the above, it is possible to reduce the asymmentrical deformation of image to the degree that it can be ignored in practical use so that a specimen having a flat surface can be thereby observed as a flat surface as it is.

The objective according to the present invention arranged to fulfill the condition shown in the above is further arranged to comprise, in the order from the object side, a first lens component having positive refractive power, a second lens component comprising a cemented meniscus doublet which consists of a positive lens and a negative lens and which has a convex surface on the object side, and a third lens component comprising a positive single lens.

The objective according to the present invention is further arranged that said first lens component comprises, in the order from the object side, at least one positive single lens, and a meniscus lens having a concave surface on the object side and having negative refractive power.

The objective according to the present invention is further arranged that said meniscus lens constituting said first lens component is arranged to comprise a cemented doublet consisting of a negative lens and a positive lens.

DETAILED DESCRIPTION OF THE PREFERRED EMBODIMENTS

Now, the content of the objective for a single-objective type binocular stereomicroscope according to the present invention is explained in detail below referring to the accompanying drawings.

Figure 1:
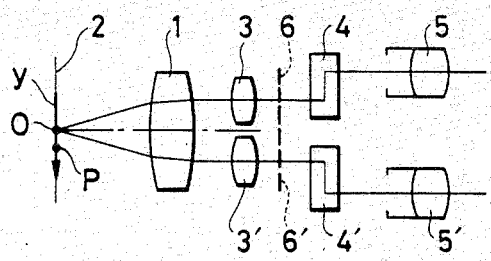
FIG. 1 shows a sectional view illustrating an optical system of a single-objective type binocular stereomicroscope.

FIG. 1 shows an optical system of a single-objective type binocular stereomicroscope. In FIG. 1, numeral 1 designates an objective, numeral 2 desgnates a specimen placed at a position near the front focal point of the objective 1, numerals 3 and 3' respectively designate a left and right imaging lenses for forming real images from an afocal image formed by the objective 1, numerals 4 and 4' respectively designate a left and right image rotator prisms for forming erect images from the real images formed by the imaging lenses 3 and 3', and numerals 5 and 5' respectively designate a left and right eyepieces for observing the erect rear images by enlarging them. In the optical system described in the above, the imaging lenses 3 and 3', image rotator prisms 4 and 4', and eyepieces 5 and 5' constitute a left and right observation optical systems respectively. Numerals 6 and 6' respectively designate pupils of the left and right observation optical systems.

Suppose that, in the optical system shown in FIG. 1, the specimen 2 exists on a flat surface which is perpendicular to the optical axis of the objective 1, the intersecting point O of the specimen surface and optical axis is called the origin, a line where the planes including the optical axes of respective imaging lenses 3 and 3' intersect with the specimen surface is called y axis, and y axis extends from a position corresponding to the left eye toward a position corresponding to the right eye.

When an arbitrary point on said y axis is represented by reference symbol P and it is supposed that the point O and point P are observed through the binocular stereomicroscope, the state of parallax between both eyes becomes as described below.

Figure 2:
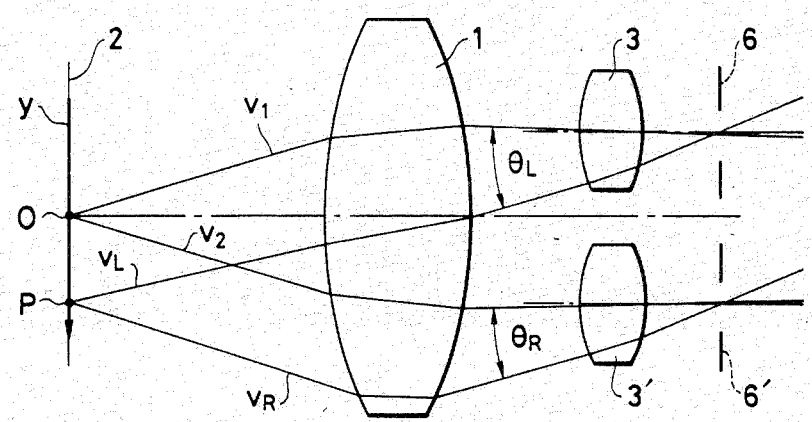
FIG. 2 shows a sectional view illustrating a part of said optical system in an enlarged state.
Figure 3:
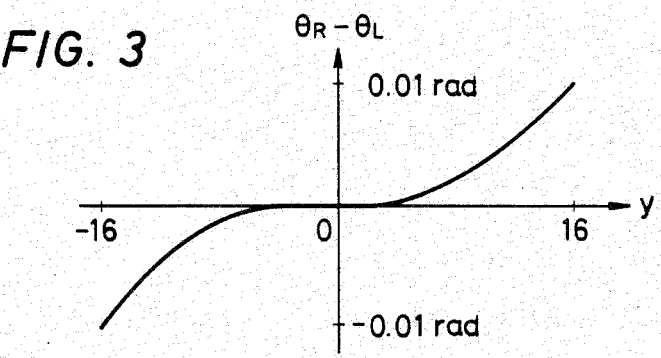
FIG. 3 shows a graph illustrating the relation between $\theta_R - \theta_L$ of rays after coming out from an objective and the object point of a known single-objective type binocular stereomicroscope.

FIG. 2 shows an enlarged view of a part of said optical system, i.e., the portion from the specimen 2 up to the pupils 6 and 6', and shows two rays $v_1$ and $v_2$ that come from the point O and pass the pupils 6 and 6' and two rays $v_L$ and $v_R$ that come from the point P and pass the pupils 6 and 6'. When the angle between the rays $v_1$ and $v_L$ and angle between the rays $v_2$ and $v_R$ which are respectively formed just after those rays come out from the objective 1 are respectively represented by reference symbols $\theta_L$ and $\theta_R$ ($\theta_L > 0$, $\theta_R > 0$), the relation between $\theta_R - \theta_L$ and value of y coordinate of the point P becomes as shown in FIG. 3 in case that an objective having the following numerical data is used as a typical example of known objectives in general.

| | | |
|---|---|---|
| $r_1 = -292.132$ | | |
| $d_1 = 4$ | $n_1 = 1.48749$ | $\nu_1 = 70.15$ |
| $r_2 = -68.225$ | | |
| $d_2 = 0.2$ | | |
| $r_3 = 270.17$ | | |
| $d_3 = 3$ | $n_2 = 1.75520$ | $\nu_2 = 27.51$ |
| $r_4 = 88.504$ | | |
| $d_4 = 7$ | $n_3 = 1.48749$ | $\nu_3 = 70.15$ |
| $r_5 = -102.195$ | | |

In the numerical data shown in the above, reference symbols $r_1, r_2, \ldots$ respectively represent radii of curvature of respective lens surfaces, reference symbols $d_1, d_2, \ldots$ respectively represent thicknesses of respective lenses and airspace between respective lenses, reference symbols $n_1$, $n_2$ and $n_3$ respectively represent refractive indices of respective lenses, and reference symbols $\nu_1$, $\nu_2$ and $\nu_3$ respectively represent Abbe's numbers of respective lenses.

It is supposed that the distance between the optical axes of the imaging lenses 3 and 3' is 22 mm and the distance from the rearmost surface of the objective to the entrance pupils of the imaging lenses 3 and 3' is 37 mm.

Not only for the objective shown in the above but also for known objectives, the relation of $\theta_R - \theta_L$ with respective object points of the objective always becomes a curve of monotone increasing pattern which is point symmetrical about the origin as shown in FIG. 3.

Figure 4A:
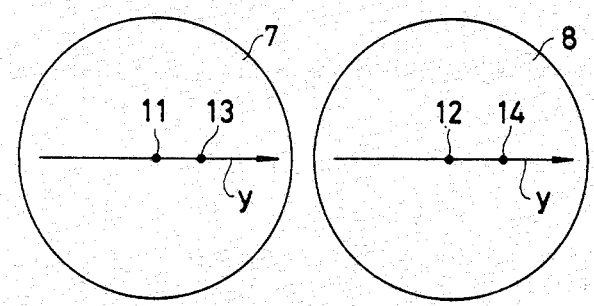
FIGS. 4A and 4B respectively show explanatory figures illustrating the right and left observed images which are observed by a known optical system.
Figure 4B:
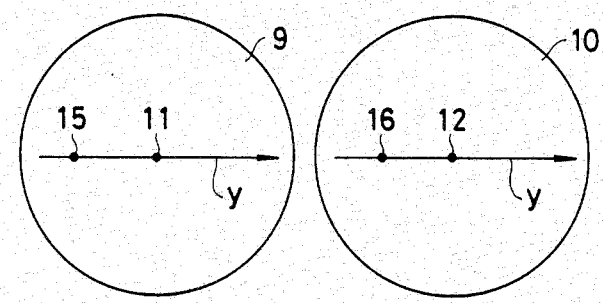
Figure 5:
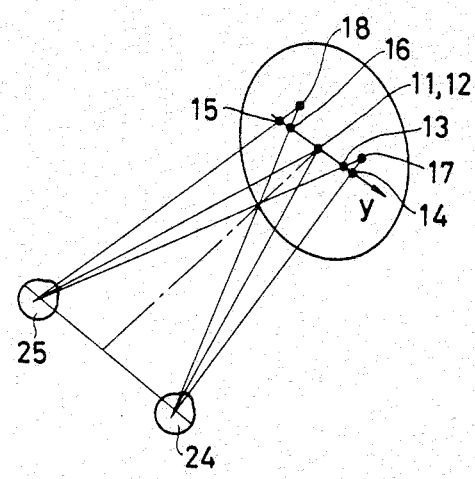
FIG. 5 shows an explanatory figure illustrating fusion points in a known optical system.

As the afocal image formed by the objective 1 is observed in the state that it is enlarged by the observation optical systems comprising the imaging lenses 3 and 3' and so forth, the observation optical systems are regarded as telescopic optical systems. Therefore, the size of images observed through the observation optical systems is decided by the incident angles is principal rays that enter the observation optical systems. Here the rays $v_1$ and $v_2$ that come from the point O and enter the observation optical systems will coincide with the optical axes of the observation optical systems when the objective 1 is completely free from aberrations. In practice, however, the objective has aberrations more or less and, consequently, the rays $v_1$ and $v_2$ are slightly inclined in respect to the optical axes of the observation optical systems. Therefore, to express the incident angles of the principal rays that enter the observation optical systems, it is preciser when the angles $\theta_L$ and $\theta_R$ formed by the rays $v_1$ and $v_2$ and principal rays $v_L$ and $v_R$ are used instead of using the angles formed by the optical axes of the observation optical systems and principal rays because, in the former case, the size of image is measured as a distance from the point O which is the center point of the area to be observed. Here, when $\theta_L$ or $\theta_R$ is the larger, the point P on y axis looks at the longer distance from the point O when observed through the observation optical systems. Therefore, when the relation between $\theta_R - \theta_L$ and y shown in FIG. 3 is taken into consideration, positions of images of object points become as shown in FIGS. 4A and 4B. As it is evident from FIG. 3, when the point P exists at a position where $y>0$, $\theta_R$ is larger than $\theta_L$ and, when the distance from the point O to the point P is the longer, the difference $\theta_R - \theta_L$ becomes the larger. Consequently, the point P observed through the right eyepiece comes to a longer distance from the point O than the point P observed through the left eyepiece. Therefore, as shown in FIG. 4A, the distance between the image 14 of the point P and the image 12 of the point O in the image 8 observed through the right eyepiece becomes longer than the distance between the image 13 of the point P and the image 11 of the point O in the image 7 observed through the left eyepiece. In contrast with the above, when the point P exists at a position where $y<0$, the distance between the image 15 of the point P and the image 11 of the point O in the image 9 observed through the left eyepiece becomes longer than the distance between the image 16 of the point P and the image 12 of the point O in the image 10 observed through the right eyepiece as shown in FIG. 4B. Due to the above-mentioned reason, a parallax occurs between both eyes 24 and 25, and it looks as if the images of respective object points form a stereoscopic image as shown in FIG. 5. That is, when the observer looks at the images 11 and 12 of the point O, the fusion point 17 of the images 13 and 14 of the point P, which exists at a position where $y>0$, or the fusion point 18 of the images 15 and 16 of the point P, which exists at a position where $y<0$, is formed at a position deeper than the fusion point of the images 11 and 12 of the point O. The fusion point means the intersecting point of extension lines obtained when the rays, which come from the same point of an image and enter the right 15 and left eyes respectively, are extended linearly in reverse direction. Here, the degree of depth becomes the larger when the parallax between both eyes, i.e., $|\theta_R - \theta_L|$, becomes the larger. Therefore, when the distance from the point O to the point P becomes the longer, the fusion point is formed at the deeper position and, consequently, the degree of depth becomes the larger.

The explanation in the above is made for the object points on y axis only. In actuality, however, object points in all directions on the specimen surface as well as y axis look at the deeper positions, compared with the object point at the center of the field, as the distance from the center of the field becomes the longer. Therefore, even when observing a flat surface, the surface looks like a convex surface.

Figure 6:
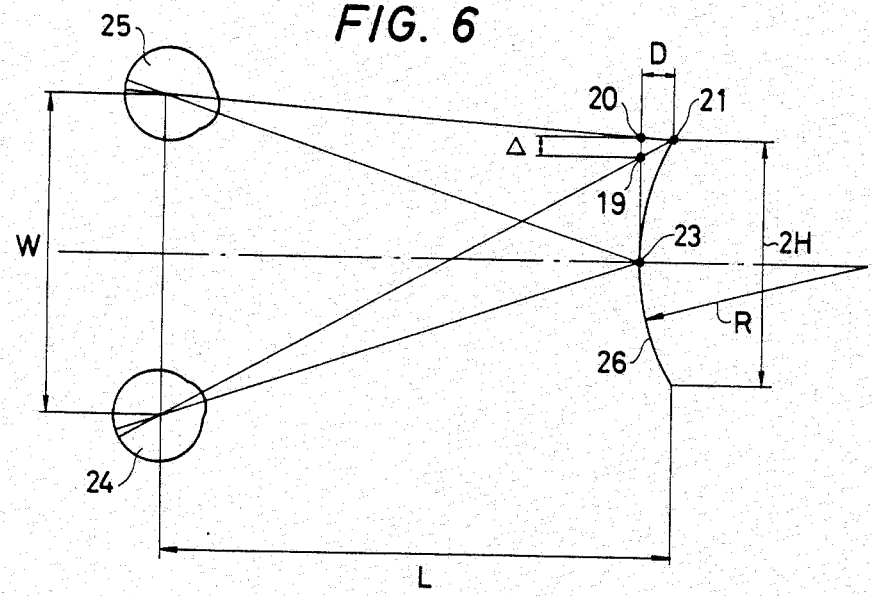
FIG. 6 shows an explanatory figure illustrating the relation between an image observed as a convex surface and observing eyes.

FIG. 6 shows the state of observation in case that the surface, which is observed as a convex surface because of the parallax as descrived in the above, is approximated to a spherical surface. In the range expressed by the following formula where reference symbol 2H represents the outer diameter of the spherical surface 26 in FIG. 6, reference symbol R represents the radius of curvature of the spherical surface, and reference symbol L represents the distance from the eyes to the circumference of the spherical surface 26, it becomes difficult to judge whether the observed surface is a spherical surface or a flat surface.

$$R > 4000H/L$$

For example, then a spherical surface with the outer diameter 2H of 100 mm is observed at the distance L of 250 mm from the eyes, the spherical surface with the radius of curvature larger than 800 mm looks like a flat surface.

When, in FIG. 6, the observed image points of the point O at the center of the field and point P in the marginal portion observed by the right eye 24 are respectively designated by numeral 23 and 19, the observed image points of the same points, i.e., the points O and P, observed by the left eye 25 are respectively designated by numerals 23 and 20, the depth of the fusion point 21 of the image points 19 and 20 seen from the image point 23 is represented by reference symbol D, the radius of curvature of the curved surface 26 including the fusion points 21 and 23 is represented by reference symbol R, the outer diameter of the curved surface 26 is represented by reference symbol L, the pupil distance between the right and left eyes is represented by reference symbol W, and the distance between the observed image points 19 and 20 is represented by reference symbol $\Delta$, there exists the relation expressed by the following formulas.

$$D = L \cdot \Delta / W$$

$$D = R - \sqrt{R^2 - H^2} \approx H^2 / 2R$$

when the afore-mentioned condition $R > 4000H/L$, which shows the limit where it becomes difficult to judge whether the surface is a spherical surface or flat surface, is applied to the relation expressed by the formulas shown in the above, the relation expressed by the following formula is obtained.

$$WH^2 / 2L\Delta > 4000H/L$$

From the above, the following relation is obtained.

$$\Delta / WH < 1/8000 \tag{a}$$

As the observation optical systems are telescopic optical systems, the following relation is formed.

$$\Delta \approx H \cdot \left| \frac{\theta_R - \theta_L}{\theta_R} \right| \tag{b}$$

From (a) and (b) shown in the above, the following relation is formed.

$$\left| \frac{\theta_R - \theta_L}{\theta_R} \right| < \frac{W}{8000}$$

As the mean value of the pupil distance W is 62 mm, the relation shown in the above becomes as follows.

$$\left| \frac{\theta_R - \theta_L}{\theta_R} \right| < 0.00775$$

Therefore, when a flat surface is observed by using an objective which fulfills the condition shown in the above, it is observed properly as a flat surface.

As an objective which fulfills the condition shown in the above, a lens system arranged as follows may be considered, i.e., a lens system comprising, in the order from the object side, a first lens component having positive refractive power, a second lens component comprising a cemented meniscus doublet which has a convex surface on the object side and which consists of a positive lens and a negative lens, and a third lens component comprising a positive single lens.

It is more effective when said first lens component is arranged to comprise, in the order from the object side, at least one positive single lens, and a meniscus lens having a concave surface on the object side and having negative refractive power.

Furthermore, it is preferable to arrange that said meniscus lens constituting said first lens component is arranged to comprise a cemented doublet consisting of a negative lens and a positive lens.

The surface on the image side of said second lens component functions to correct the rays so as to make $\theta_R$ larger when the point P exists at a position where $y>0$ and to make $\theta_R$ larger when the point P exists at a position where $y<0$. The ray $v_L$ from the point P at a position where $y>0$ and the ray $v_R$ from the point P at a position where $y<0$ intersect with the optical axis of the objective at a position near this meniscus lens (the second lens component). Therefore, the amount of correction for $\theta_R$ or $\theta_L$ by the surface on the object side of said thick meniscus lens becomes different from the amount of correction for $\theta_R$ or $\theta_L$ by the surface on the image side of said thick meniscus lens and, consequently, the correction by the surface on the object side is not offset by the correction by the surface on the image side. However, for $\theta_R$ when the point P exists at a position where $y>0$ and for $\theta_L$ when the point P exists at a position where $y<0$, the correcting effects by the surface on the object side and surface on the image side of said meniscus lens become just reverse to each other and, consequently, a correcting effect is not produced on the whole.

In cases of objectives in general, $\theta_R$ becomes larger than $\theta_L$ ($\theta_R > \theta_L$) when the point P exists at a position where $y>0$, and $\theta_R$ becomes smaller than $\theta_L$ ($\theta_R < \theta_L$) when the point P exists at a position where $y<0$ as already explained based on FIG. 3. Therefore, when the second lens component is arranged as a meniscus lens so that the surface on the image side thereof has the aforementioned correcting function to make $\theta_L$ larger when $y>0$ and to make $\theta_R$ larger when $y<0$, it is possible to make $|\theta_R - \theta_L|$ small.

Besides, when said meniscus lens constituting the second lens component is arranged as a cemented doublet, it is also possible to correct chromatic aberration.

Furthermore, when a meniscus lens is arranged in the first lens component as mentioned before, it is possible to correct Petzval's sum and, at the same time, it is effective for making $|\theta_R - \theta_L|$ small.

That is, the surface on the object side of said meniscus lens in the first lens component serves to correct so that $\theta_R$ is made smaller when the point P exists at a position where $y>0$ and $\theta_L$ is made smaller when the point P exists at a position where $y<0$. Therefore, said meniscus lens in the first lens component functions to make $|\theta_R - \theta_L|$ small. Besides, as the surface on the object side of said meniscus lens in the first lens component has negative refractive power, the above-mentioned correcting function is not offset by the surface on the image side thereof.

Furthermore, the lens system according to the present invention is arranged to distribute positive refractive power to the first lens component and the third lens component so as to thereby obtain the desired refractive power which is required for an objective. The above-mentioned distribution of positive refractive power serves to make the amounts of aberrations such as spherical aberration etc. small and, at the same time, to adjust the working distance. That is, as the second lens component has a function to shift the principal point of the objective as a whole toward the object side, the working distance of the objective might become too long. Therefore, by giving positive refracitve power to the third lens component, the working distance is adjusted so that it will not become too long. Besides, by arranging the second lens component which serves to correct chromatic aberration at a position between the first and second lens components which cause chromatic aberration, the objective according to the present invention is arranged to correct longitudinal chromatic aberration and lateral chromatic aberration in well balanced state.

When an objective as a whole has a strong refractive power, the amount of chromatic aberration to be caused by the first lens component becomes larger in case that the refractive power of the first lens component is made stronger in order to make the working distance comparatively long than in case that the refractive power of the third lens component is made stronger in order to make the working distance comparatively long. When the refractive power of the first lens component is made stronger, it is impossible to correct chromatic aberration satisfactorily by the second lens component only. In such case, it is preferable to adopt a cemented meniscus doublet in the first lens component and to thereby correct chromatic aberration to some extent within the first lens component itself. Besides, it is preferable to increase the number of positive single lenses in the first lens component in accordance with the positive refractive power of the first lens component as a whole.

Now, preferred embodiments of the objective for a binocular stereomicroscope according to the present invention which is described in detail in the above are shown below.

| Embodiment 1 | | |
|---|---|---|
| $r_1 = 48.005$ | | |
| $d_1 = 8$ | $n_1 = 1.48749$ | $v_1 = 70.2$ |
| $r_2 = -1403.259$ | | |
| $d_2 = 0.2$ | | |
| $r_3 = 64.898$ | | |
| $d_3 = 11$ | $n_2 = 1.50137$ | $v_2 = 56.4$ |
| $r_4 = -69.029$ | | |
| $d_4 = 3.7$ | $n_3 = 1.6765$ | $v_3 = 37.5$ |
| $r_5 = 40.843$ | | |
| $d_5 = 5.1$ | | |
| $r_6 = 124.521$ | | |
| $d_6 = 4.3$ | $n_4 = 1.8044$ | $v_4 = 39.6$ |
| $r_7 = -266.591$ | | |
| $f = 99.998$, | WD = 102.14 | |
| Embodiment 2 | | |
| $r_1 = 147.202$ | | |
| $d_1 = 7$ | $n_1 = 1.48749$ | $v_1 = 70.2$ |
| $r_2 = -102.195$ | | |
| $d_2 = 2.5$ | | |
| $r_3 = -56.868$ | | |
| $d_3 = 5$ | $n_2 = 1.60342$ | $v_2 = 38.0$ |
| $r_4 = -305.702$ | | |
| $d_4 = 0.3$ | | |
| $r_5 = 50.883$ | | |
| $d_5 = 6$ | $n_3 = 1.61293$ | $v_3 = 37.0$ |
| $r_6 = 101$ | | |
| $d_6 = 6.5$ | $n_4 = 1.71736$ | $v_4 = 29.5$ |
| $r_7 = 49.086$ | | |
| $d_7 = 5.5$ | | |

-continued

| | | |
|---|---|---|
| $r_8 = \infty$ | | |
| $d_8 = 5.9$ | $n_5 = 1.641$ | $\nu_5 = 56.9$ |
| $r_9 = -70.551$ | | |
| $f = 132.97$, | $WD = 118.41$ | |

Embodiment 3

| | | |
|---|---|---|
| $r_1 = 211.535$ | | |
| $d_1 = 6.5$ | $n_1 = 1.641$ | $\nu_1 = 56.9$ |
| $r_2 = -86.686$ | | |
| $d_2 = 1.9$ | | |
| $r_3 = -54.935$ | | |
| $d_3 = 4$ | $n_2 = 1.6445$ | $\nu_2 = 40.8$ |
| $r_4 = 137.71$ | | |
| $d_4 = 5$ | $n_3 = 1.48749$ | $\nu_3 = 70.2$ |
| $r_5 = -296.631$ | | |
| $d_5 = 0.3$ | | |
| $r_6 = 52.761$ | | |
| $d_6 = 8.2$ | $n_4 = 1.70154$ | $\nu_4 = 41.2$ |
| $r_7 = \infty$ | | |
| $d_7 = 4$ | $n_5 = 1.6445$ | $\nu_5 = 40.8$ |
| $r_8 = 47.354$ | | |
| $d_8 = 5.2$ | | |
| $r_9 = \infty$ | | |
| $d_9 = 6.7$ | $n_6 = 1.48749$ | $\nu_6 = 70.2$ |
| $r_{10} = -60.572$ | | |
| $f = 133.1$, | $WD = 117.34$ | |

Embodiment 4

| | | |
|---|---|---|
| $r_1 = 136.314$ | | |
| $d_1 = 8.2$ | $n_1 = 1.63854$ | $\nu_1 = 55.4$ |
| $r_2 = -66.704$ | | |
| $d_2 = 1.4$ | | |
| $r_3 = -51.700$ | | |
| $d_3 = 4.0$ | $n_2 = 1.6445$ | $\nu_2 = 40.8$ |
| $r_4 = 111.014$ | | |
| $d_4 = 5.5$ | $n_3 = 1.497$ | $\nu_3 = 81.6$ |
| $r_5 = -174.187$ | | |
| $d_5 = 0.2$ | | |
| $r_6 = 38.671$ | | |
| $d_6 = 5.4$ | $n_4 = 1.70154$ | $\nu_4 = 41.2$ |
| $r_7 = 68.687$ | | |
| $d_7 = 4.0$ | $n_5 = 1.6765$ | $\nu_5 = 37.5$ |
| $r_8 = 34.613$ | | |
| $d_8 = 7.5$ | | |
| $r_9 = \infty$ | | |
| $d_9 = 5.8$ | $n_6 = 1.48749$ | $\nu_6 = 70.1$ |
| $r_{10} = -65.334$ | | |
| $f = 100$, | $WD = 89.026$ | |

Embodiment 5

| | | |
|---|---|---|
| $r_1 = 116.54$ | | |
| $d_1 = 13$ | $n_1 = 1.48749$ | $\nu_1 = 70.2$ |
| $r_2 = -40.922$ | | |
| $d_2 = 0.2$ | | |
| $r_3 = 146.175$ | | |
| $d_3 = 6.9$ | $n_2 = 1.497$ | $\nu_2 = 81.6$ |
| $r_4 = -92.646$ | | |
| $d_4 = 4.1$ | | |
| $r_5 = -44.106$ | | |
| $d_5 = 4.4$ | $n_3 = 1.6765$ | $\nu_3 = 37.5$ |
| $r_6 = 64.058$ | | |
| $d_6 = 12.2$ | $n_4 = 1.497$ | $\nu_4 = 81.6$ |
| $r_7 = -64.058$ | | |
| $d_7 = 0.2$ | | |
| $r_8 = 35.162$ | | |
| $d_8 = 16.1$ | $n_5 = 1.64769$ | $\nu_5 = 33.8$ |
| $r_9 = -75.023$ | | |
| $d_9 = 4.6$ | $n_6 = 1.71852$ | $\nu_6 = 33.5$ |
| $r_{10} = 29.424$ | | |
| $d_{10} = 7$ | | |
| $r_{11} = 149.6$ | | |
| $d_{11} = 6$ | $n_7 = 1.72$ | $\nu_7 = 43.7$ |
| $r_{12} = -215.374$ | | |
| $f = 49.98$, | $WD = 42.29$ | |

In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the objective as a whole, and reference symbol WD represents the working distance. Besides, the distance between the optical axes of the observation optical systems is 22 mm. and the distance from the rearmost surface of the objective to the entrance pupils of the observation optical systems is 37 mm.

Figure 7:
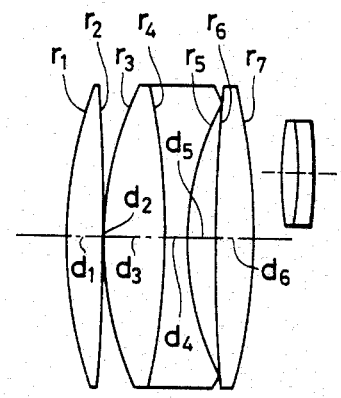
FIGS. 7 through 11 respectively show sectional views of Embodiments 1 through 5 of the objective according to the present invention.

Out of respective embodiments shown in the above, Embodiment 1 has the lens configuration as shown in FIG. 7. That is, in Embodiment 1, the first lens component comprises a positive single lens, the second lens component comprises a cemented meniscus doublet which consists of a positive lens and a negative lens and which has a convex surface on the object side, and the third lens component comprises a positive single lens.

Embodiment 2 has the lens configuration as shown in FIG. 7. That is, in Embodiment 2, the first lens component comprises a positive single lens and a negative meniscus lens, the second lens component comprises a cemented meniscus doublet which consists of a positive lens and a negative lens and which has a convex surface on the object side, and the third lens component comprises a positive single lens.

Figure 9:
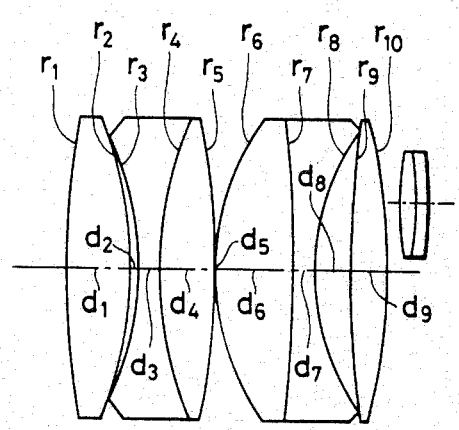
Figure 8:
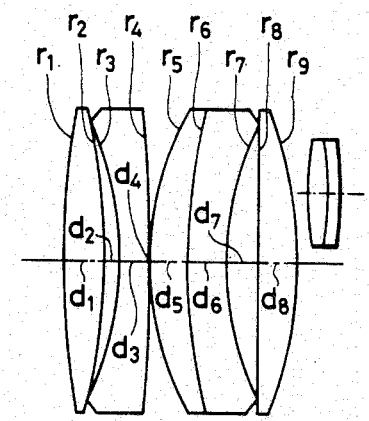
Figure 10:
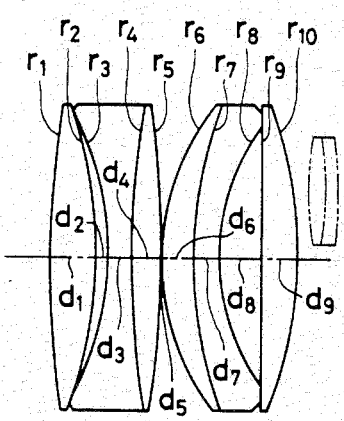

Embodiment 3 has the lens configuration as shown in FIG. 9 and Embodiment 4 has the lens configuration as shown in FIG. 10. That is, in Embodiments 3 and 4, the first lens component comprises a positive single lens and a cemented meniscus doublet which consists of a negative lens and a positive lens, the second lens component comprises a cemented meniscus doublet which consists of a positive lens and a negative lens and which has a convex surface on the object side, and the third lens component comprises a positive single lens.

Figure 11:
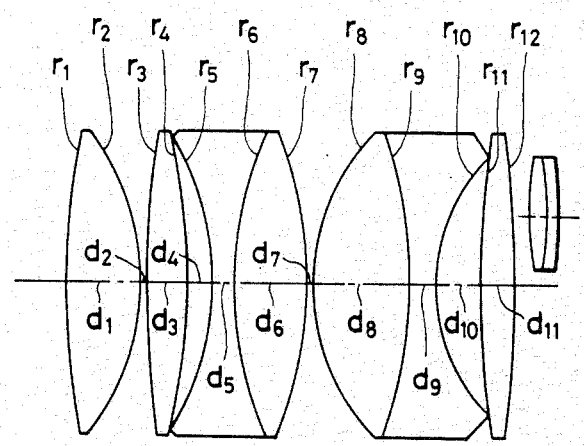
Figure 12:
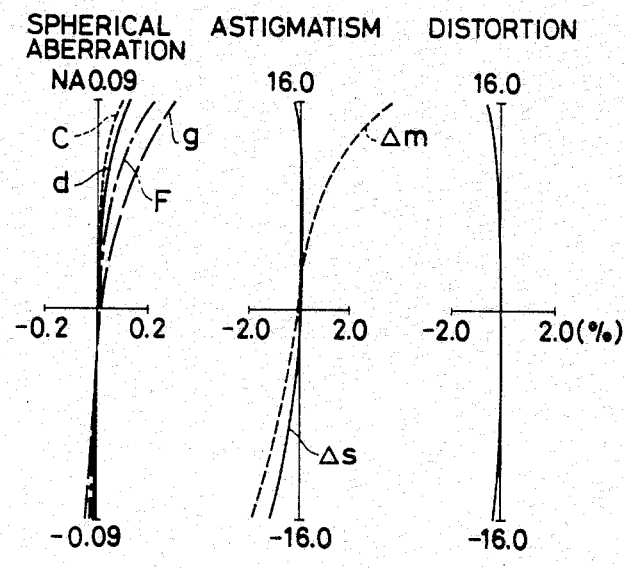
FIGS. 12 through 16 respectively show graphs illustrating aberration curves of Embodiments 1 through 5 of the objective according to the present invention.
Figure 13:
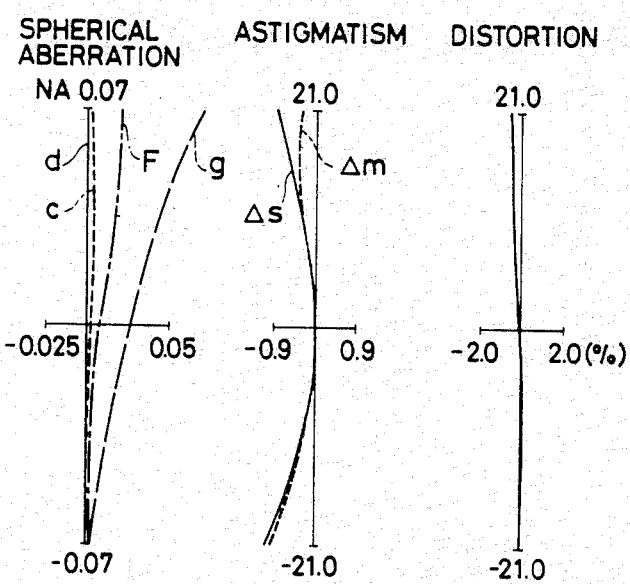
Figure 14:
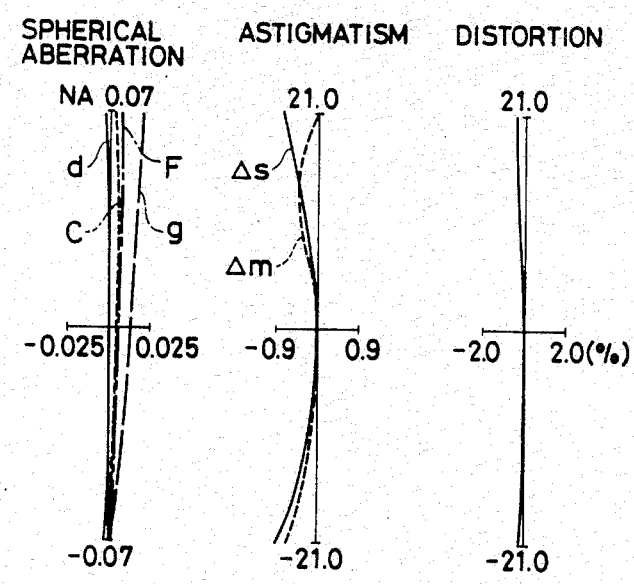
Figure 15:
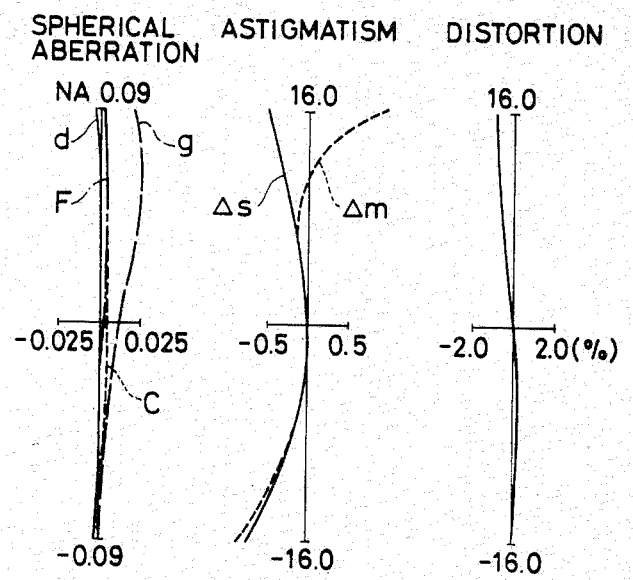
Figure 16:
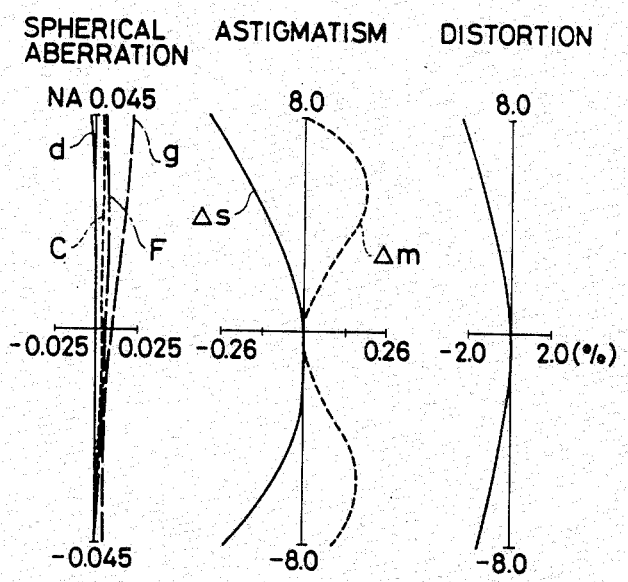

Embodiment 5 has the lens configuration as shown in FIG. 11. That is, in Embodiment 5, the first lens component comprises two positive single lenses and a cemented meniscus doublet which consists of a negative lens and a positive lens, the second lens component comprises a cemented meniscus doublet which consists of a positive lens and a negative lens and which has a convex surface on the object side, and the third lens component comprises a positive single lens.

Graphs of aberration curves of respective embodiments shown in the above are shown in FIGS. 12 through 16. All of spherical aberration, astigmatism and distortion shown in said graphs of aberration curves are obtained by letting the rays enter the objective from the observation optical system side and tracing those rays and are expressed by using the ray, which passes the optical axis of the observation optical system as the reference line.

As described so far, the objective according to the present invention does not cause the error in the perception of depth and distance that the central portion of the observed image looks as if it is risen though said objective is invented for the use with a single-objective type binocular stereomicroscope and, especially in the observation of specimens having flat surfaces such as IC masks, IC wafers, etc. for which the frequency of observation is increasing in these years, the objective according to the present invention makes it possible to observe them without causing the sense of incompatibility or malaise. Besides, as the objective according to the present invention forms an image which is free from deformation, it reduces the fatigue of workers when it is used with an industrial microscope.

We claim:

1. An objective for a binocular stereomicroscope to be used with a single-objective type binocular stereomicroscope comprising an objective for forming an afocal image, and two observation optical systems for observing said afocal image by the right and left eyes, said objective for a binocular stereomicroscope being arranged to fulfill the condition shown below where reference symbol $\theta_R$ represents the angle between a ray that comes from an arbitrary point in a plane to be observed, which is perpendicular to the optical axis of said objective, and passes the center of pupil of one of said observation optical systems after passing through said objective and a ray that comes from the intersecting point of said plane to be observed and the optical axis of said objective and passes said center of pupil of said one of said observation optical systems after passing through said objective, said angle being formed by said two rays just after said two rays come out from said objective, and reference symbol $\theta_L$ represents the angle between a ray that comes from said arbitrary point in said plane to be observed and passes the center of pupil of the other one of said observation optical systems after passing through said objective and a ray that comes from said intersecting point of said plane to be observed and the optical axis of said objective and passes said center of pupil of said other one of said observation optical systems after passing through said objective, said angle being formed by said two rays just after said two rays come out from said objective.

$$\left| \frac{\theta_R - \theta_L}{\theta_R} \right| < 0.00775$$

2. An objective for a binocular stereomicroscope according to claim 1 comprising, in the order from the object side, a first lens component having positive refractive power, a second lens component comprising a cemented meniscus doublet which consists of a positive lens and a negative lens and which as a convex surface on the object side, and a third lens component comprising a positive single lens.

3. An objective for a binocular stereomicroscope according to claim 2 wherein said first lens component comprises a positive single lens.

4. An objective for a binocular stereomicroscope according to claim 2 wherein said first lens component comprises at least one positive single lens, and a negative meniscus lens having a concave surface on the object side.

5. An objective for a binocular stereomicroscope according to claim 4 wherein said negative meniscus lens constituting said first lens component is arranged to comprise a cemented meniscus doublet consisting of a negative lens and a positive lens.

6. An objective for a binocular stereomicroscope according to claim 3 having the following numerical data:

| | | |
|---|---|---|
| $r_1 = 48.005$ | | |
| $d_1 = 8$ | $n_1 = 1.48749$ | $\nu_1 = 70.2$ |
| $r_2 = -1403.259$ | | |
| $d_2 = 0.2$ | | |
| $r_3 = 64.898$ | | |
| $d_3 = 11$ | $n_2 = 1.50137$ | $\nu_2 = 56.4$ |
| $r_4 = -69.029$ | | |
| $d_4 = 3.7$ | $n_3 = 1.6765$ | $\nu_3 = 37.5$ |
| $r_5 = 40.843$ | | |

-continued

| | | |
|---|---|---|
| $d_5 = 5.1$ | | |
| $r_6 = 124.521$ | | |
| $d_6 = 4.3$ | $n_4 = 1.8044$ | $\nu_4 = 39.6$ |
| $r_7 = -266.591$ | | |
| $f = 99.998$, | $WD = 102.14$ | | where, reference symbol $r_1$ through $r_7$ respectively represent radii of curvature of respective lens surfaces, reference symbols $d_1$ through $d_6$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbol f represents the focal length of the objective as a whole, and reference symbol WD represents the working distance.

7. An objective for a binocular stereomicroscope according to claim 4 having the following numerical data:

| | | |
|---|---|---|
| $r_1 = 147.202$ | | |
| $d_1 = 7$ | $n_1 = 1.48749$ | $\nu_1 = 70.2$ |
| $r_2 = -102.195$ | | |
| $d_2 = 2.5$ | | |
| $r_3 = -56.868$ | | |
| $d_3 = 5$ | $n_2 = 1.60342$ | $\nu_2 = 38.0$ |
| $r_4 = -305.702$ | | |
| $d_4 = 0.3$ | | |
| $r_5 = 50.883$ | | |
| $d_5 = 6$ | $n_3 = 1.61293$ | $\nu_3 = 37.0$ |
| $r_6 = 101$ | | |
| $d_6 = 6.5$ | $n_4 = 1.71736$ | $\nu_4 = 29.5$ |
| $r_7 = 49.086$ | | |
| $d_7 = 5.5$ | | |
| $r_8 = \infty$ | | |
| $d_8 = 5.9$ | $n_5 = 1.641$ | $\nu_5 = 56.9$ |
| $r_9 = -70.551$ | | |
| $f = 132.97$, | $WD = 118.41$ | | where, reference symbols $r_1$ through $r_9$ respectively represent radii of curvature of respective lens surfaces, reference symbols $d_1$ through $d_8$ respectively represent thicknesses of respective lenses and airspaces between respective lenses, reference symbols $n_1$ through $n_5$ respectively represent refractive indices of respective lenses, reference symbols $\nu_1$ through $\nu_5$ respectively represent Abbe's numbers of respective lenses, reference symbol f represents the focal length of the objective as a whole, and reference symbol WD represents the working distance.

8. An objective for a binocular stereomicrosope according to claim 5 having the following numerical data:

| | | |
|---|---|---|
| $r_1 = 211.535$ | | |
| $d_1 = 6.5$ | $n_1 = 1.641$ | $\nu_1 = 56.9$ |
| $r_2 = -86.686$ | | |
| $d_2 = 1.9$ | | |
| $r_3 = -54.935$ | | |
| $d_3 = 4$ | $n_2 = 1.6445$ | $\nu_2 = 40.8$ |
| $r_4 = 137.71$ | | |
| $d_4 = 5$ | $n_3 = 1.48749$ | $\nu_3 = 70.2$ |
| $r_5 = -296.631$ | | |
| $d_5 = 0.3$ | | |
| $r_6 = 52.761$ | | |
| $d_6 = 8.2$ | $n_4 = 1.70154$ | $\nu_4 = 41.2$ |
| $r_7 = \infty$ | | |
| $d_7 = 4$ | $n_5 = 1.6445$ | $\nu_5 = 40.8$ |
| $r_8 = 47.354$ | | |
| $d_8 = 5.2$ | | |

-continued

| | | |
|---|---|---|
| $r_9 = \infty$ | | |
| $d_9 = 6.7$ | $n_6 = 1.48749$ | $\nu_6 = 70.2$ |
| $r_{10} = -60.572$ | | |
| $f = 133.1$, | $WD = 117.34$ | | where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the objective as a whole, and reference symbol symbol WD represents the working distance.

9. An objective for a binocular stereomicroscope according to claim 5 having the following numerical data:

| | | |
|---|---|---|
| $r_1 = 136.314$ | | |
| $d_1 = 8.2$ | $n_1 = 1.63854$ | $\nu_1 = 55.4$ |
| $r_2 = -66.704$ | | |
| $d_2 = 1.4$ | | |
| $r_3 = -51.700$ | | |
| $d_3 = 4.0$ | $n_2 = 1.6445$ | $\nu_2 = 40.8$ |
| $r_4 = 111.014$ | | |
| $d_4 = 5.5$ | $n_3 = 1.497$ | $\nu_3 = 81.6$ |
| $r_5 = -174.187$ | | |
| $d_5 = 0.2$ | | |
| $r_6 = 38.671$ | | |
| $d_6 = 5.4$ | $n_4 = 1.70154$ | $\nu_4 = 41.2$ |
| $r_7 = 68.687$ | | |
| $d_7 = 4.0$ | $n_5 = 1.6765$ | $\nu_5 = 37.5$ |
| $r_8 = 34.613$ | | |
| $d_8 = 7.5$ | | |
| $r_9 = \infty$ | | |
| $d_9 = 5.8$ | $n_6 = 1.48749$ | $\nu_6 = 70.1$ |
| $r_{10} = -65.334$ | | |
| $f = 100$, | $WD = 89.026$ | | where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, reference symbols $\nu_1$ through $\nu_6$ respectively represent Abbe's numbers of respective lenses, reference symbol f represents the focal length of the objective as a whole, and reference symbol WD represents the working distance.

10. An objective for a binocular stereomicroscope according to claim 5 having the following numerical data:

| | | |
|---|---|---|
| $r_1 = 116.54$ | | |
| $d_1 = 13$ | $n_1 = 1.48749$ | $\nu_1 = 70.2$ |
| $r_2 = -40.922$ | | |
| $d_2 = 0.2$ | | |
| $r_3 = 146.175$ | | |
| $d_3 = 6.9$ | $n_2 = 1.497$ | $\nu_2 = 81.6$ |
| $r_4 = -92.646$ | | |
| $d_4 = 4.1$ | | |
| $r_5 = -44.106$ | | |
| $d_5 = 4.4$ | $n_3 = 1.6765$ | $\nu_3 = 37.5$ |
| $r_6 = 64.058$ | | |
| $d_6 = 12.2$ | $n_4 = 1.497$ | $\nu_4 = 81.6$ |
| $r_7 = -64.058$ | | |
| $d_7 = 0.2$ | | |
| $r_8 = 35.162$ | | |
| $d_8 = 16.1$ | $n_5 = 1.64769$ | $\nu_5 = 33.8$ |
| $r_9 = -75.023$ | | |
| $d_9 = 4.6$ | $n_6 = 1.71852$ | $\nu_6 = 33.5$ |
| $r_{10} = 29.424$ | | |
| $d_{10} = 7$ | | |
| $r_{11} = 149.6$ | | |
| $d_{11} = 6$ | $n_7 = 1.72$ | $\nu_7 = 43.7$ |
| $r_{12} = -215.374$ | | |
| $f = 49.98$, | $WD = 42.29$ | | where, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_7$ respectively represent refractive indices of respective lenses, reference symbols $\nu_1$ through $\nu_7$ respectively represent Abbe's numbers of respective lenses, reference symbol f represents the focal length of the objective as a whole, and reference symbol WD represents the working distance.

* * * * *